(No Model.)
M. JEFFERSON, W. W. L. LISHMAN & J. CLAPHAM.
BEARING FOR LOOSE PULLEYS.
No. 558,392. Patented Apr. 14, 1896.
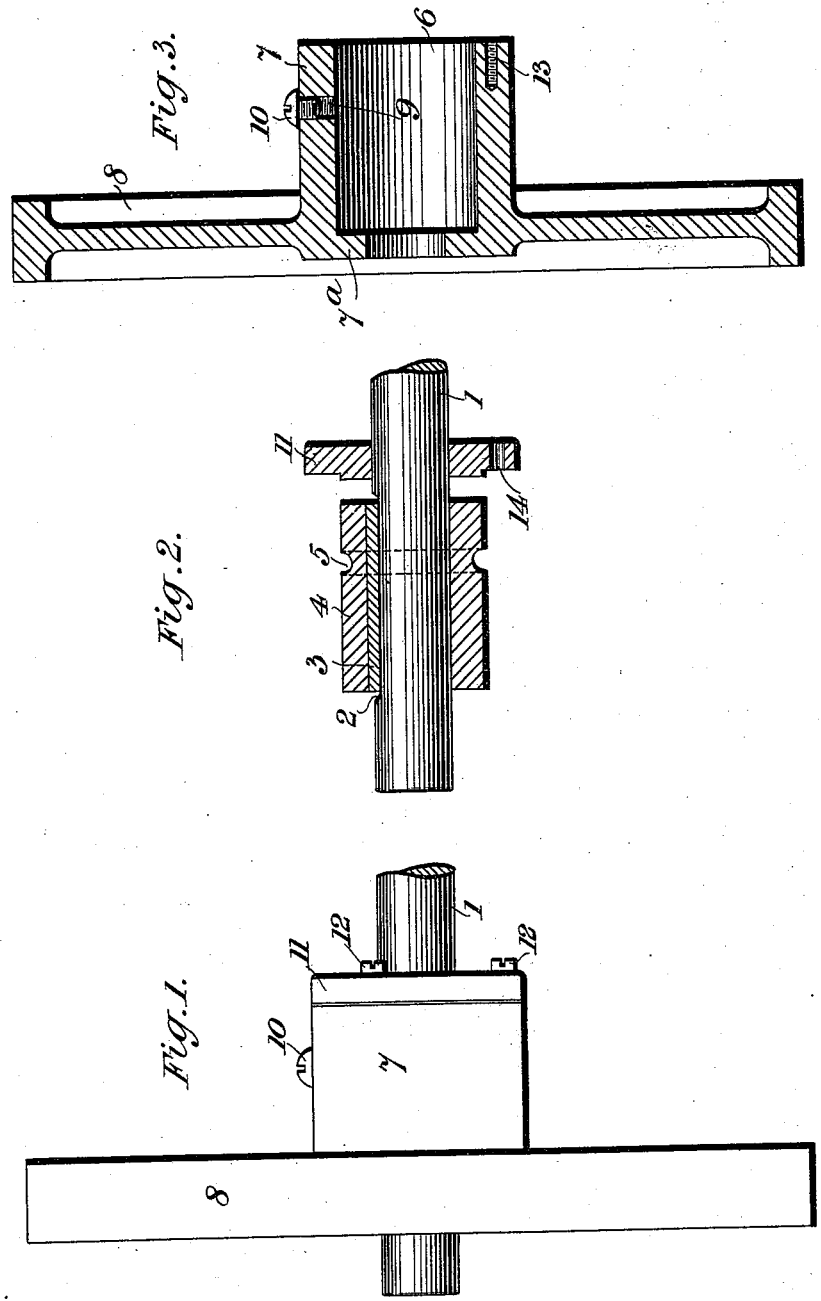
WITNESSES.
INVENTORS.

UNITED STATES PATENT OFFICE.

MORDECAI JEFFERSON, OF BRADFORD, WALTER WILLIAM LANCASTER LISHMAN, OF CORNHOLME, AND JOHN CLAPHAM, OF BRADFORD, ENGLAND.

BEARING FOR LOOSE PULLEYS.

SPECIFICATION forming part of Letters Patent No. 558,392, dated April 14, 1896.

Application filed December 2, 1895. Serial No. 570,853. (No model.)

*To all whom it may concern:*

Be it known that we, MORDECAI JEFFERSON, residing at Bradford, in the county of York, WALTER WILLIAM LANCASTER LISHMAN, residing at Cornholme, in the county of Lancaster, and JOHN CLAPHAM, residing at Bradford, in the county of York, England, subjects of Her Majesty the Queen of Great Britain, have invented a certain new and useful Improved Bearing for Loose Pulleys, of which the following is a specification.

The object of this invention is to provide an improved bearing for loose pulleys, whereby a sufficient supply of lubricant can be applied to sufficiently lubricate it for a considerable period, and whereby all dripping and waste of the lubricant is obviated, and the lubricant is protected from dust and dirt.

In the accompanying drawings, Figure 1 is an elevation of a loose pulley constructed according to our invention, showing a portion of a shaft. Fig. 2 is an elevation of the shaft with the boss and collar, hereinafter referred to, in section. Fig. 3 is a sectional elevation of the pulley alone.

The shaft 1 is preferably grooved, as at 2, to receive a key 3, which holds in place a solid cylindrical boss 4, the key being first laid in the groove and the boss driven on over the same, or the boss may be secured on the shaft in other ways. The boss 4 has a groove or recess 5 in the periphery of same and said boss is received in a chamber 6, formed in an extension-hub 7 of the pulley 8, said boss fitting snugly in the chamber. The extension-hub 7 is provided with an integral flange 7$^a$ and with an opening 9, which may be closed by a screw-plug 10. Upon the shaft is also placed a loose flanged collar 11, which is secured to the hub 7 of the pulley by screws 12, passing through an opening 14 in the collar and into a screwed opening 13 in the extension of the hub, packing material being placed between the surfaces, if required.

Upon oil or lubricant being poured into the hole 9 the groove 5 will be filled and a film of the lubricating material will spread over the surface of the boss 4, the collar 11 and flange 7$^a$ preventing the lubricant from escaping at the ends. It is evident that the groove or recess 5 might be formed in the interior of the chamber 6 instead of on the boss 4. By this construction an exceedingly cheap and simple self-lubricating bearing is provided.

What we claim is—

A pulley provided with an extension-hub, a chamber 6 in said hub, an opening 9 through the extension of said hub into the said chamber and means for closing the said opening; an integral flange 7$^a$ at one end of the said chamber; a solid cylindrical boss secured to the shaft about which the pulley is to revolve, and adapted to fit into the chamber aforesaid, a groove 5 in the periphery of the said boss and communicating with the opening in the hub aforesaid, a loose flanged collar 11 adapted to fit in one end of the aforesaid chamber and the flanged portion thereof to be screwed to the inner face of the extension-hub, substantially as described.

In testimony whereof we have hereunto set our hands in the presence of two subscribing witnesses.

MORDECAI JEFFERSON.
WALTER WILLIAM LANCASTER LISHMAN.
JOHN CLAPHAM.

Witnesses:
E. ACKROYD,
TOM FORTUNE.